US012801630B2

(12) United States Patent
Brown et al.

(10) Patent No.: US 12,801,630 B2
(45) Date of Patent: *Nov. 17, 2026

(54) COORDINATED ASYNCHRONOUS AND REAL-TIME DATABASE UPDATE PROCESSING

(71) Applicant: State Farm Mutual Automobile Insurance Company, Bloomington, IL (US)

(72) Inventors: Richard Carl Brown, Normal, IL (US); Ryan Leverton, Bloomington, IL (US); Stephanie Langland, El Paso, IL (US); Keith Sartain, Yorkville, IL (US); Deepak Maheshwari, Bloomington, IL (US); Merril Myers, Bloomington, IL (US)

(73) Assignee: State Farm Mutual Automobile Insurance Company, Bloomington, IL (US)

( * ) Notice: Subject to any disclaimer, the term of this patent is extended or adjusted under 35 U.S.C. 154(b) by 0 days.

This patent is subject to a terminal disclaimer.

(21) Appl. No.: 19/329,274

(22) Filed: Sep. 15, 2025

(65) Prior Publication Data

US 2026/0010547 A1 Jan. 8, 2026

Related U.S. Application Data

(63) Continuation of application No. 18/462,221, filed on Sep. 6, 2023, now Pat. No. 12,436,970.

(51) Int. Cl.

| | |
|---|---|
| ***G06F 16/27*** | (2019.01) |
| ***G06F 16/23*** | (2019.01) |

(52) U.S. Cl.

CPC .............. *G06F 16/27* (2019.01); *G06F 16/23* (2019.01)

(58) Field of Classification Search

CPC ................................ G06F 16/27; G06F 16/23

USPC .......................................................... 707/610

See application file for complete search history.

(56) References Cited

U.S. PATENT DOCUMENTS

| | | | |
|---|---|---|---|
| 7,543,003 | B2 | 6/2009 | Shukla et al. |
| 11,249,976 | B1 | 2/2022 | Kushner et al. |
| 11,423,886 | B2 | 8/2022 | Gruber et al. |
| 2020/0104938 | A1 | 4/2020 | Gorojovsky et al. |
| 2024/0193022 | A1 | 6/2024 | Saito et al. |
| 2025/0021392 | A1 | 1/2025 | Ahmed et al. |

*Primary Examiner* — Vaishali Shah
*Assistant Examiner* — Lauren Zannah Ganger
(74) *Attorney, Agent, or Firm* — Lee & Hayes, P.C.

(57) ABSTRACT

This disclosure describes techniques for handling asynchronous and synchronous requests to update a database field. Asynchronous update requests are stored in a queue and processed later, while synchronous requests are processed immediately to return the current state. Requests that generate errors are stored in a separate error queue and retried later. The data field state is updated in a state database based on both asynchronous and synchronous requests. State updates are provided to a software application via different communication channels like persistent connections, representational state transfer (REST) application programming interfaces (APIs), and WebSocket notifications based on configurable state definitions. This allows the software application to retrieve the latest data field state synchronously or receive asynchronous notifications when the state changes.

20 Claims, 6 Drawing Sheets

COORDINATED ASYNCHRONOUS AND REAL-TIME DATABASE UPDATE PROCESSING

RELATED APPLICATIONS

This application claims priority to and is a continuation of U.S. patent application Ser. No. 18/462,221, filed on Sep. 6, 2023. The contents of which are incorporated herein in their entirety.

TECHNICAL FIELD

The present disclosure relates to database management, and more particularly to techniques for coordinated processing of both asynchronous and real-time database update requests to improve end-to-end efficiency of manual and/or automated processing operations by continually updating the state (e.g., the action(s) and/or status(es)) of a unique processing plan for a processing task and recommending the next best action(s) for that processing task.

BACKGROUND

Conventional techniques for processing database updates face shortcomings when it comes to enabling both asynchronous and real-time database updates. These techniques often involve manual intervention or batch processing, both of which lead to significant delays and potential inconsistencies in data across the system. Moreover, conventional techniques usually lack robust mechanisms for handling real-time updates, fail to provide timely responses, and cause discrepancies between different data sources.

Additionally, conventional techniques fail to enable both synchronized and real-time database updates using a scalable framework as the data size increases. As data volumes grow, traditional systems often experience performance degradation due to their inability to handle the increased load efficiently. This is largely due to outdated architectures that were not designed to accommodate big data processing. These shortcomings lead to longer processing times, increased latency, and system crashes. Furthermore, conventional techniques do not often incorporate robust error-handling mechanisms, which increases the risk of data loss or corruption as the data size expands. Accordingly, the lack of scalability in conventional systems restricts their utility in data-intensive environments.

Examples of the techniques described in the present disclosure are directed to overcoming the deficiencies noted above. Additionally, there is a need for improving end-to-end efficiency of manual and/or automated processing operations.

SUMMARY

In some aspects, the techniques described herein relate to a computer-implemented method, including receiving, by a processor and at a first time, a first request for updating a first data field asynchronously. The techniques further relate to storing, by the processor and at the first time, the first request in an asynchronous queue. The techniques further relate to receiving, by the processor and at a second time, a second request for updating the first data field synchronously. The techniques further relate to determining, by the processor and at the second time, a first state of the first data field based on the second request. The techniques further relate to providing, by the processor and at the second time, the first state to a software application. The techniques further relate to retrieving, by the processor and at a third time, the first request from the asynchronous queue. The techniques further relate to determining, by the processor and at the third time, a second state of the first data field based on the first request. The techniques further relate to providing, by the processor and at the third time, the second state to the software application.

In additional examples, the techniques described herein relate to a computing system, including: a processor; and memory storing computer-executable instructions that, when executed by the processor, cause the computing system to perform operations including receiving, by the processor and at a first time, a first request for updating a first data field asynchronously. The techniques further relate to storing, by the processor and at the first time, the first request in an asynchronous queue. The techniques further relate to receiving, by the processor and at a second time, a second request for updating the first data field synchronously. The techniques further relate to determining, by the processor and at the second time, a first state of the first data field based on the second request. The techniques further relate to providing, by the processor and at the second time, the first state to a software application. The techniques further relate to retrieving, by the processor and at a third time, the first request from the asynchronous queue. The techniques further relate to determining, by the processor and at the third time, a second state of the first data field based on the first request. The techniques further relate to providing, by the processor and at the third time, the second state to the software application.

In further examples, the techniques described herein relate to one or more non-transitory computer-readable media storing computer-executable instructions that, when executed by the processor, cause the one or more processors to perform operations, including receiving, by the processor and at a first time, a first request for updating a first data field asynchronously. The techniques further relate to storing, by the processor and at the first time, the first request in an asynchronous queue. The techniques further relate to receiving, by the processor and at a second time, a second request for updating the first data field synchronously. The techniques further relate to determining, by the processor and at the second time, a first state of the first data field based on the second request. The techniques further relate to providing, by the processor and at the second time, the first state to a software application. The techniques further relate to retrieving, by the processor and at a third time, the first request from the asynchronous queue. The techniques further relate to determining, by the processor and at the third time, a second state of the first data field based on the first request. The techniques further relate to providing, by the processor and at the third time, the second state to the software application.

BRIEF DESCRIPTION OF THE DRAWINGS

The detailed description is set forth with reference to the accompanying figures. In the figures, the left-most digit(s) of a reference number identifies the figure in which the reference number first appears. The use of the same reference numbers in different figures indicates similar or identical items or features.

DETAILED DESCRIPTION

This disclosure describes techniques for handling asynchronous and synchronous requests to update a database field. Asynchronous update requests are stored in a queue and processed later, while synchronous requests are processed immediately to return the current state. Requests that generate errors are stored in a separate error queue and retried later. The data field state is updated in a state database based on both asynchronous and synchronous requests. State updates are provided to a software application via different communication channels like persistent connections, representational state transfer (REST) application programming interfaces (APIs) (e.g., via REST API queries and/or calls), and WebSocket notifications based on configurable state definitions. This allows the software application to retrieve the latest data field state synchronously or receive asynchronous notifications when the state changes.

Figure 1:
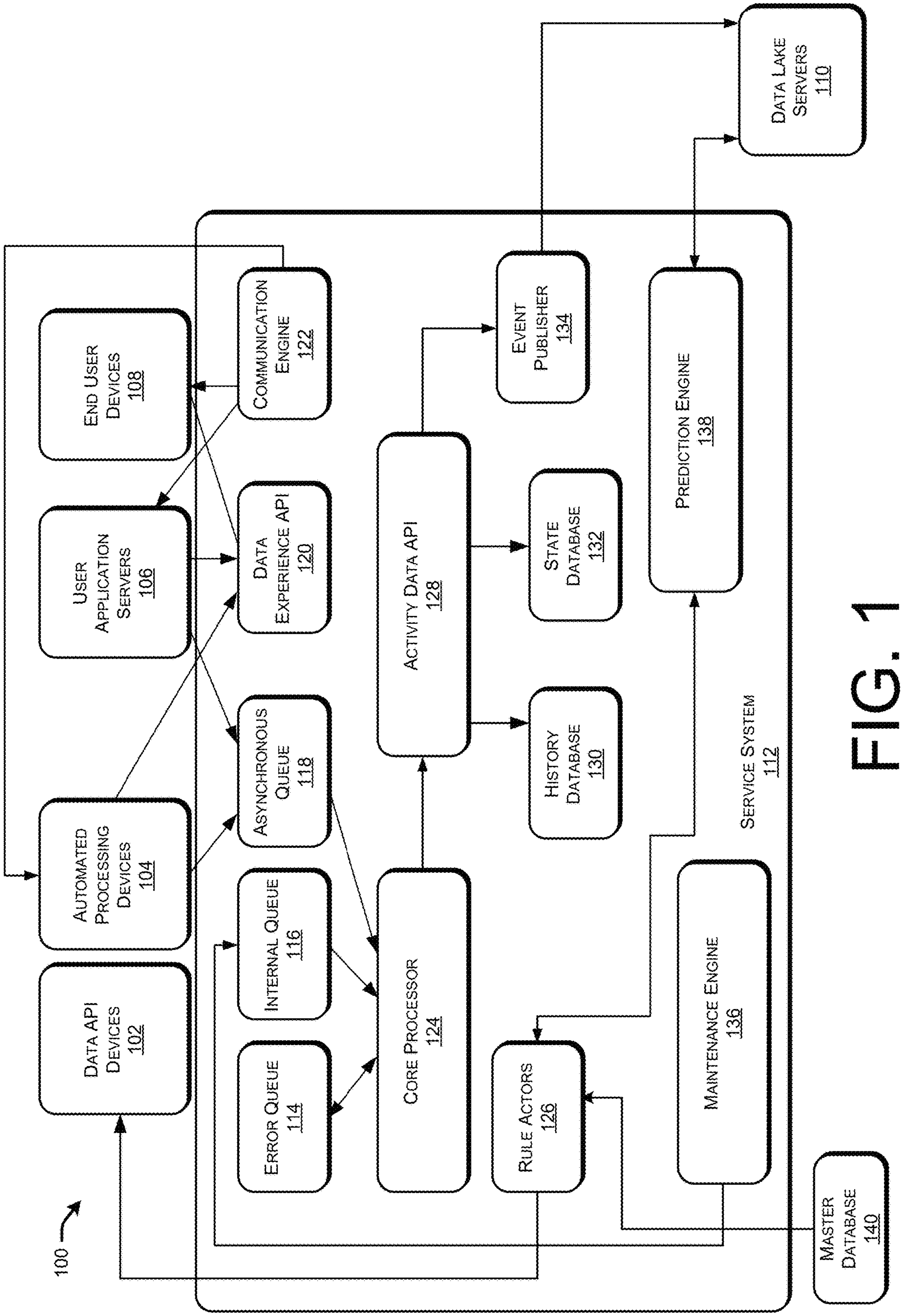
FIG. 1 provides an environment for enabling coordinated asynchronous and real-time updates of a database.

FIG. 1 provides an environment 100 for enabling coordinated asynchronous and real-time updates of a state database 132. As depicted, environment 100 includes a service system 112 that interacts with one or more secondary system. The service system 112 may be a system including multiple devices and/or server partitions. The service system 112 may include partitions for computing, storage, and memory. Examples of secondary system include data application programming interface (API) devices 102, automated processing devices 104, user application servers 106, end-user devices 108, and data lake servers 110.

Secondary system may interact with the service system 112 to request database updates or to request data. As noted above, examples of secondary system include data API devices 102, automated processing devices 104, user application servers 106, end-user devices 108, and data lake servers 110. Data API devices 102 are secondary system that provide database update requests or data retrieval requests to the service system 112 using API calls. Data API devices 102 may be used in the process of automatic data exchange to facilitate interoperability between different systems and platforms and transmit data updates that might come from various sources like databases, cloud platforms, or other servers.

Automated processing devices 104 are secondary system that generate database update requests or data retrieval requests to perform automated processes without direct manual interventions. A database update request may describe a change in a database such as the master database 140. Automated processing devices 104 might include software applications or hardware devices designed for specific tasks, such as data collection, analysis, or reporting. In examples, an automated processing device 104 may initiate an asynchronous update of state database 132 data.

User application servers 106 are secondary system that enable other secondary system (e.g., end-user devices 108) to execute cloud-based software applications. For example, user application servers 106 may host web or mobile applications that end-user devices 108 access over the internet to manage insurance claims. In examples, user application servers 106 provide front-end functionality to back-end services provided by the service system 112.

End-user devices 108 are secondary system that enable a user to directly provide database update requests or data retrieval requests to the service system 112. Examples of end-user devices 108 include personal computer devices, tablet devices, or smartphone devices used by end users to communicate with the service system 112. In examples, end-user devices 108 enable end users to provide requests for real-time update of state database 132 data.

Data lake servers 110 are secondary system that enable storing data in or managing data stored by a data lake. A data lake may be a large storage repository that holds a vast amount of raw data in its native format until needed. This raw data can be structured or unstructured, and the service system 112 can use this data for various processes, such as for predictive data analysis operations performed by the prediction engine 138.

Service system 112 enables secondary system to update the state database 132. These updates can be performed asynchronously or in real-time. Additionally, the service system 112 uses the communication engine 122 to push notifications to secondary system about state database 132 updates. Furthermore, the service system 112 records logs of all state database updates in the update history database 130 to provide an audit trail of such updates. Next, the service system 112 uses the prediction engine 138 to perform predictive data analysis operations (e.g., machine learning operations) based on the data stored by at least one of the state database 132, the update history database 130, or the data lake servers 110. Moreover, the service system 112 uses the maintenance engine 136 to perform periodic maintenance jobs such as updating the state definitions used by rule actors 126 to map update requests (e.g., asynchronous update requests) to states (e.g., to activities and/or respective statuses for those activities), modifying existing claim plans, or deleting old data stored in at least one of the state database 132 or the update history database 130. The rule actors 126 may map update requests to states based on data (e.g., claim data) retrieved from the data API devices 102 and/or from the master database 140.

The service system 112 may include an error queue 114, an internal queue 116, an asynchronous queue 118, a data experience API 120, a communication engine 122, a core processor 124, a set of rule actors 126, an activity data API 128, an update history database 130, a state database 132, an event publisher 134, a maintenance engine 136, and a prediction engine 138. Collectively, these components of the service system 112 may enable processing and executing database updates, including asynchronous and real-time updates; providing database update notifications and data in response to data retrieval requests; performing predictive data analysis operations; and performing maintenance jobs with respect to one or more components of the service system 112, such as with respect to the core processor 124 and/or the state database 132.

The error queue 114 stores database update requests that are not successfully processed by the core processor 124. When the core processor 124 processes a database update request using the rule actors 126, the core processor 124 maps the database update request to an activity field and retrieves the state of the mapped activity field. If this mapping fails, the core processor 124 stores the database update in the error queue. 114. The core processor 124 may (e.g., periodically or in response to a trigger, such as an update of the state definitions used by the rule actors 126) retrieve database update requests that are stored in the error queue 114 to retry processing those retrieved requests based on the state definitions and by querying the rule actors 126. The rule actors 126 may use the state definitions to determine whether a request relates to an activity and, if so, if the request updates the status of that activity. A state of a request may refer to at least one of an activity or an activity status affected by the request. In examples, the error queue 114 stores asynchronous updates that fail processing. The core processor 124 can retry these later to ensure no data is lost.

The internal queue 116 may store database update requests that attempt to update a database field that does not exist. For example, if a database update request relates to updating the claim plan for a claim that currently does not have a claim plan, the activity data API 128 stores the claim plan in the internal queue 116. The internal queue 116 may store real-time database update requests that attempt to update a database field that does not exist. In examples, the service system 112 (e.g., periodically or in response to a trigger) retrieves database update requests from the internal queue 116 to process such requests by creating the missing data fields (e.g., creating claim plans) and updating such data fields. In examples, the internal queue 116 stores events for new claim plans or updates to existing claim plans that need to be generated. An insurance claim's claim plan may refer to the specific steps and procedures that an insurance company follows when processing and settling a claim filed by a policyholder. The claim plan may outline the guidelines and processes involved in assessing, investigating, and ultimately paying out or denying a claim.

The asynchronous queue 118 stores asynchronous database requests, such as asynchronous database update requests received from the automated processing devices 104 or the user application servers 106. In examples, after a client device provides an asynchronous database update request to the service system 112, this update request is stored in the asynchronous queue 118 for retrieval using the core processor 124. In examples, the asynchronous queue 118 receives and stores claim data updates from external systems to be processed asynchronously. In some cases, a claim is asynchronous if it is placed in the asynchronous queue 118, and real-time if it is provided to the data experience API 120.

The data experience API 120 enables processing real-time database update requests and data retrieval requests. After receiving a real-time update request from a client device (e.g., from an automated processing device 104, a user application server 106, or an end-user device 108), the data experience API 120 processes the received request to determine the state associated with the request. The state may include an activity field and/or an activity field status that is affected by the request. The data experience API 120 sends the determined state to the activity data API 128 for storage in the state database 132.

The data experience API 120 may additionally enable data retrieval requests. In examples, the data experience API 120 may provide requested data using user-specific database views. A database view may define a customized subset and/or formatting of data for different users based on their role or preferences. For example, a claim handler may have a view that shows only open claim activities in a certain order, while an insured has a view showing only completed activities and payments. These views enable tailoring the raw claim data into meaningful information displays for each user via a user interface. The data experience API 120 can apply the appropriate view to retrieve and transform the data on-the-fly in response to real-time requests. User-specific views allow efficient and configurable access to claim data.

Operations of the data experience API 120 may be parallelized to enable parallelized processing of various real-time database update requests. For example, multiple instances of the data experience API 120 may run simultaneously, each processing different update requests independently. Such parallel processing can significantly boost the system's performance, enabling it to handle larger volumes of data or more complex tasks without compromising speed or efficiency. The real-time update requests that enter the system are then distributed across these multiple instances to reduce the overall processing time. For example, the data experience API 120 may run on a compute cluster that spreads incoming requests across nodes. As real-time update requests come in, a load balancer distributes them to the nodes for parallel processing.

The communication engine 122 pushes notifications (e.g., to subscribed devices/systems) about state database 132 updates to secondary system and/or client applications. For example, communication engine 122 may push notifications to users when claim data is updated so their views refresh automatically. The communication engine 122 may push notifications using a WebSocket connection. A WebSocket connection allows fast, real-time, and bidirectional communication between the service system 112 and the secondary system. This allows "pushing" notifications immediately after data changes rather than clients having to poll for updates continuously. In examples, the communication engine 122 receives data from the activity data API 128 and relays this received data to the appropriate client device.

In examples, when the activity data API 128 stores an update to the state database 132, the activity data API 128 can trigger the communication engine 122 to send a notification of the change. The communication engine 122 may maintain open WebSocket connections with registered client applications. The communication engine 122 can then push the notification through those connections to the relevant clients so they can refresh their views. The communication engine 122 may thus abstract the complexity of maintaining persistent sockets and transmission of messages. Components like the activity data API 128 simply invoke the communicator engine when notifications are needed. Using WebSocket connections, the communication engine 122 provides real-time and event-driven push notifications to clients. This creates a reactive system where application user interfaces are updated immediately in response to data changes. The communication engine 122 thus reduces costly polling from clients and duplication of push notification logic across multiple components of the service system 112.

The core processor 124 retrieves asynchronous database update requests from the asynchronous queue 118, processes the retrieved requests by querying the rule actors 126 to determine states for those requests, and provides the determined state to the activity data API 128. The core processor 124 may be parallelized to enable parallel processing of various asynchronous database update requests. In examples, by pulling updates from the asynchronous queue 118 for asynchronous processing, the core processor 124 workload can scale independently to handle spikes in updates. The asynchronous queue 118 decouples the update receipt from the actual processing. For each update, the core processor 124 may query the rule actors 126, which in turn may apply state definitions to determine how a request impacts claim activities and states. The state definitions may contain various algorithms, conditions, workflows, and other logic for state determination defined by subject matter experts. Keeping application of these definitions by the rule actors 126 separate from operations of the core processor 124 code allows them to be modified easily and deployed independently, for example on the data experience API 120.

Operations of the core processor 124 may be parallelized to enable parallel processing of various asynchronous database update requests. For example, the core processor 124 may use a compute grid that partitions the asynchronous queue 118 and allows spreading update requests across nodes for concurrent processing. As updates come in for that node's queue partition, the node may process those updates independently. The results may then be sent back to the centralized activity data API 128 for aggregation and storage. The activity data API 128 can handle inserting the parallel state results into the appropriate database tables and claims. This horizontal scaling approach increases the overall core processor 124 throughput as more nodes are added. The number of nodes can scale up or down dynamically based on queue size and processing demands. Parallelizing the core processor 124 operations in this way enables asynchronous update processing performance to scale on demand. Large update request spikes can be handled by transparently adding more nodes without code changes. This maintains fast throughput as claim volume grows.

In examples, multiple instances of the core processor 124 may run simultaneously, each processing different update requests independently. Such parallel processing can significantly boost the system's performance, enabling it to handle larger volumes of data or more complex tasks without compromising speed or efficiency.

The state definitions used by the rule actors 126 contain the logic to determine how database update requests (e.g., claim data update states) map to required activities and current states. Different definitions (e.g., rules) can be authored by domain experts. The state definitions may contain various algorithms, conditions, workflows, and other logic for state determination defined by subject matter experts. The state definitions can be stored in a business-friendly format accessible to non-technical authors. For example, a web interface may allow claims managers to define workflows and conditions using simple templates rather than coding. Authors can create definitions for different claim types, regions, products, etc. In examples, keeping the state definitions separate from the core processor 124 and data experience API 120 codebases provides increased flexibility and modularity. Domain experts can define and modify definitions without needing to update the main application code, new definitions can be tested without impacting production systems, and definitions can be rolled out incrementally to user groups for gradual deployment.

The activity data API 128 provides an interface for retrieving and storing data, such as claim activity data. The activity data API 128 may handle storing database updates based on states provided by the core processor 124 or the data experience API 120. For example, when one of the rule actors 126 successfully processes an asynchronous update against the state definitions, the core processor 124 sends the state results to the data experience API 128. The activity data API 128 determines which database tables and records should be updated based on the state results and executes those updates. Similarly, when the data experience API 120 successfully processes an asynchronous update, the data experience API 120 sends the state results to the data experience API 128. The activity data API 128 then determines which database tables and records should be updated based on the state results and executes those updates. The data experience API 128 may also perform database connection pooling, caching, performance optimization, and other data access best practices.

The update history database 130 stores records of all state database 132 updates and/or activity state changes (e.g., for audit and/or data restoration purposes). Each record in the update history database 130 may include details such as the update's timestamp, the update type, the data fields affected by the update, the identity of the client device that initiated the update, and/or the like. In examples, the update history database 130 is a valuable tool for data restoration and disaster recovery. If the state database 132 is compromised due to an error, security breach, or system failure, the update history can be used to roll back the database to a previous reliable state. The update history database 130 can help pinpoint the time and nature of any disruptive changes to aid in system troubleshooting.

The state database 132 stores the primary data maintained by the service system 112 as well as updated and retrieved by the secondary system. The state database 132 may store all core claim details, policy info, activities, states, and/or the like. For example, the state database 132 may store data such as the policyholder's personal details, the specifics of the insurance policy (coverage, premium, duration, etc.), the history and details of any claims made against the policy (dates, claim amounts, nature of incidents, etc.), and the state of ongoing activities related to the policy (e.g., claim processing state, renewal state, dispute resolution state, etc.). The state database 132 may be implemented using either a relational or non-relational database management system. The state database 132 can be on-premises or cloud-based.

The event publisher 134 publishes state change events for other downstream systems and/or to data lakes maintained by data lake servers 110. Upon detection of a state change, which may be triggered by either an asynchronous update or a real-time update, the event publisher 134 creates an event. This event includes pertinent details about the state change such as the nature of the change, the timestamp, the affected data, and/or the like. The event publisher 134 then disseminates this event to downstream systems that "listen" for such events.

For example, a client device might respond to an event by updating its local data, an analysis tool might use the events to track trends, or a notification service might use the events to alert users about changes. The event publisher 134 may include a message broker like Apache Kafka or RabbitMQ and/or a managed event bus service like Amazon SNS or Google Cloud Pub/Sub.

The maintenance engine 136 executes maintenance jobs to update processing plans associated with different data entities (e.g., claims, such as insurance claims). Updating processing plans may include adding new activities and/or steps to those plans. These updates may be necessitated by business requirement changes and/or changes in enrollment statuses of users and/or policyholders.

For example, the maintenance engine 136 may periodically evaluate existing processing plans to identify any required updates based on new business rules or regulations. As another example, the maintenance engine 136 may update processing plans when a policyholder's membership status changes (e.g. they enroll in a new insurance program), which may require adding or modifying activities in their existing claim processing plans.

The prediction engine 138 processes data (e.g., data in the state database 132, update history database 130, data lakes maintained by data lake servers 110, and/or the like) to perform predictive data analysis operations, such as machine learning operations. For example, the prediction engine 138 may apply machine learning algorithms to claims data in the state database 132 to predict the likelihood of future claims. This may be based on factors such as the policyholder's demographic information, claim history, coverage type, and external factors like weather patterns or crime rates in their area.

As another example, the prediction engine 138 may also use machine learning to analyze data from the update history database 130 and identify patterns or anomalies in the way updates are made. This may be used to identify potential issues before they cause significant problems, or it may be used to identify opportunities to improve the efficiency or effectiveness of the update process. Additionally, the prediction engine 138 may use data from the data lakes maintained by the data lake servers 110 for broader trend analysis. For example, the prediction engine 138 may analyze large volumes of data to identify societal trends or industry-wide patterns that might affect the insurance industry.

The techniques depicted in FIG. 1 may improve the computational efficiency of database update processing by enabling parallel processing of asynchronous updates and real-time requests using components like the core processor 124 and the data experience API 120. These components can be parallelized across multiple nodes to improve throughput and response times significantly.

For example, the core processor 124 may use a compute grid to distribute incoming asynchronous updates across nodes for concurrent processing. This allows the overall update processing throughput to scale out linearly as more nodes are added. Similarly, multiple instances of the data experience API 120 could handle real-time requests in parallel. This parallel processing approach provides an efficient way to boost performance and handle spikes in request volume.

Additionally, the techniques depicted in FIG. 1 may provide a resilient and scalable architecture for ingesting high volumes of asynchronous updates. In examples, the asynchronous queue 118 decouples the arrival of asynchronous database update requests from processing those requests. This queue-based approach allows the workload of the core processor 124 to scale independently to handle variations in update request volume. The asynchronous queue 118 buffers spikes in updates so the core processor 124 does not get overwhelmed. Additional core processor 124 nodes can be provisioned as needed based on the asynchronous queue 118 size.

In examples, to process an asynchronous update request, a client device stores an update request in the asynchronous queue 118. Afterward, the core processor 124 retrieves the request and queries the rule actors 126, one or more of the rule actors 126 processes the update request in accordance with the state definitions to obtain state results and returns the results to the core processor 124. Subsequently, the core processor 124 sends the state results to the activity data API 128 for storage in the state database 132. Subsequently, the communication engine 122 pushes notifications to secondary system about the stored update to trigger the refreshing of user views.

For example, if a car repair estimate is added for a claim, this addition triggers storing an update request to queue 118. The core processor 124 retrieves this event, uses rule actors 126 to run state definitions to determine that the repair requires a "manage repairs" activity to be added, and stores this new activity and state in the state database 132.

In examples, to process a real-time update request, a client device sends an update request to the data experience API 120. The data experience API 120 then processes the to determine corresponding states. The data experience API 120 then sends state results to the data activity API 128 for storage in the state database 132. Updated data may then be returned to the client device in real time.

For example, if an end-user device 108 adds a car repair estimate to a claim, the end-user device 108 calls the data experience API 120 to get the current view associated with the claim. The data experience API 120 determines that the "manage repairs" activity was recently added, so it returns this updated state to the end-user device 108, which displays the updated state to the end user.

Figure 2:
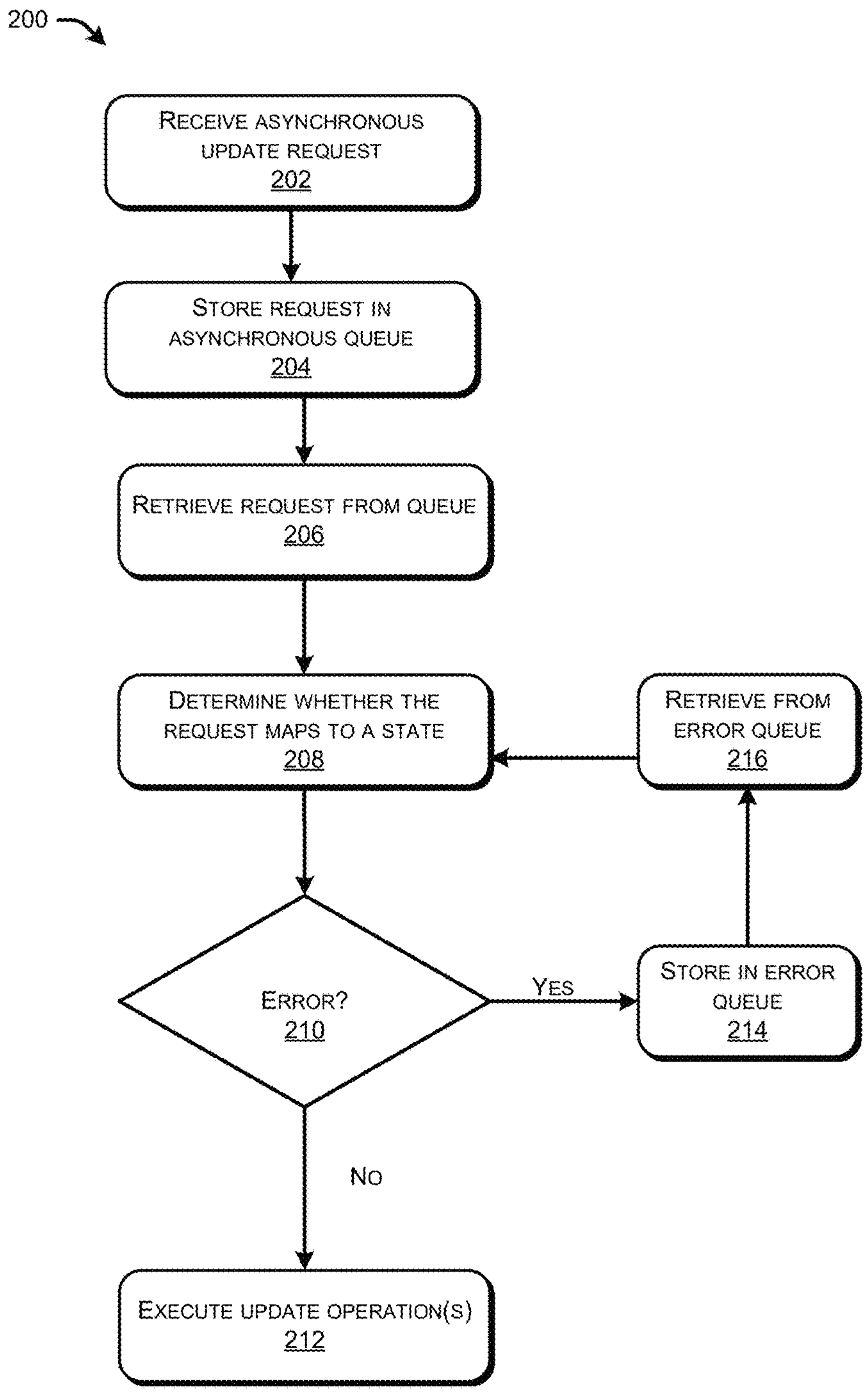
FIG. 2 is a flowchart diagram of an example process for processing an asynchronous database update request.

FIG. 2 is a flowchart diagram of an example process 200 for processing an asynchronous database update request. At operation 202, service system 112 receives the asynchronous database update request. The request may be a notification of update in particular data, such as data (e.g., claim data, user, data, and/or the like) stored in the master database 140.

At operation 204, the service system 112 stores the request in asynchronous queue 118. In examples, after a client device provides an asynchronous database update request to the service system 112, this update request is stored in asynchronous queue 118 for retrieval using the core processor 124. In examples, the asynchronous queue 118 stores the requests according to an ordering determined based on receipt time and/or an update priority.

At operation 206, the core processor 124 retrieves the asynchronous database update request from asynchronous queue 118. In examples, the core processor 124 retrieves the asynchronous database update request from asynchronous queue 118 in accordance with the position of the request in the ordering associated with asynchronous queue 118. In examples, the core processor 124 retrieves requests (e.g., from at least one of error queue 114, internal queue 116, or asynchronous queue 118) using a set of parallel execution threads.

At operation 208, the core processor 124 determines whether the asynchronous database update request successfully maps to a state. The core processor 124 may use the rule actors 126 to process the request in accordance with the state definitions to determine whether the request maps to an activity and, if so, retrieve the state of the activity. In examples, this mapping operation may be unsuccessful if the request does not match any activity fields and/or if state definitions are unavailable (e.g., the corresponding storage medium is inaccessible and/or down).

At operation 210, the core processor 124 determines whether mapping the asynchronous database update request to a state resulted in an error. If not, the core processor 124 proceeds to operation 212. Otherwise, the core processor 124 stores the request in error queue 114 at operation 214, retrieves the request from error queue 114 at operation 216, and performs operation 208 again to determine again whether, given the changed state of the service system 112, the asynchronous database update request now successfully maps to a state.

At operation 212, the core processor 124 executes update operations corresponding to the asynchronous database update request. In examples, the core processor 124 executes the update operations by providing the state result mapped to the request to the activity data API 128. The activity data API 128 may then update the state database 132 based on the state result.

Figure 3:
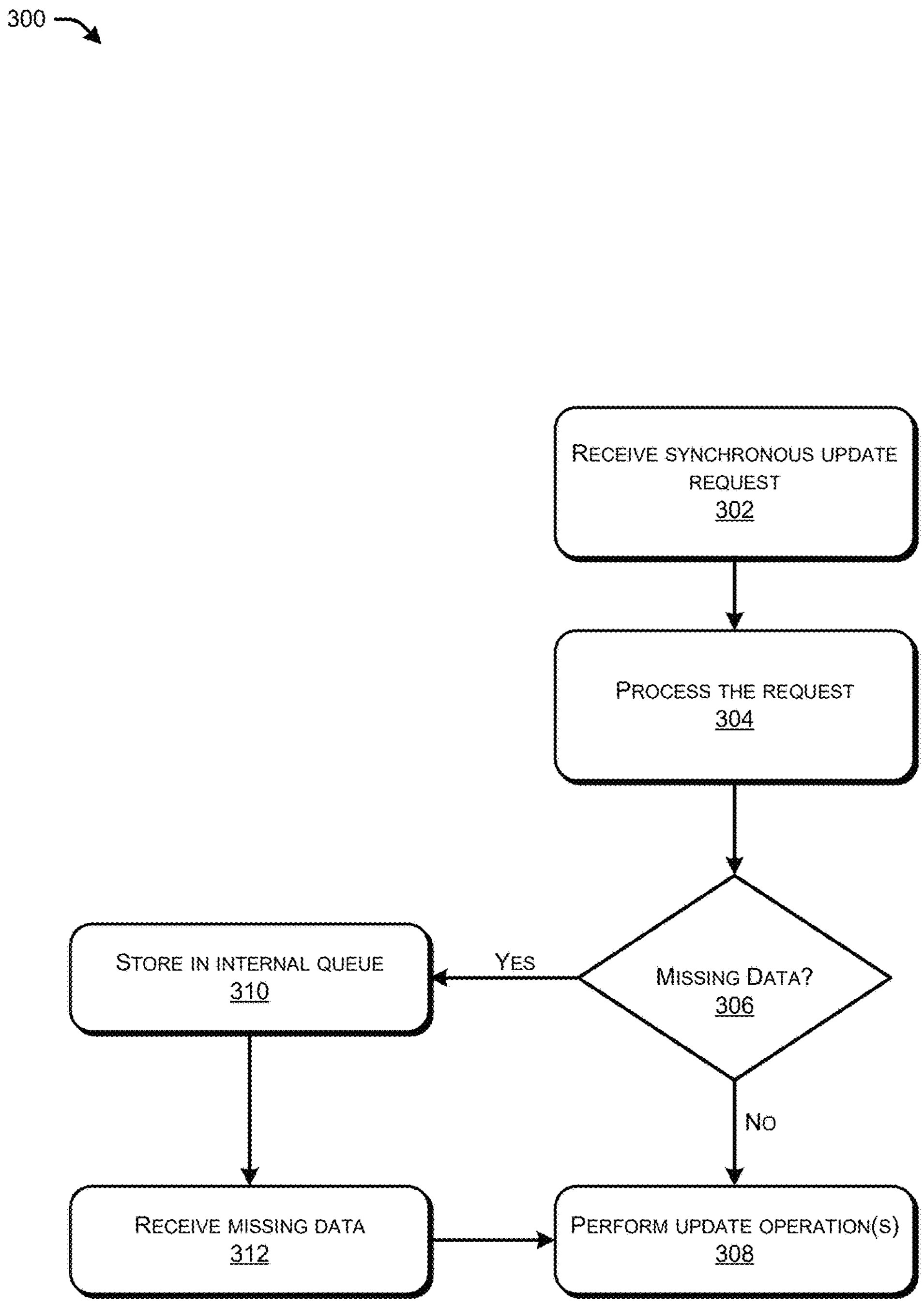
FIG. 3 is a flowchart diagram of an example process for processing a real-time database update request.

FIG. 3 is a flowchart diagram of an example process 300 for processing a real-time database update request. At operation 302, the data experience API 120 receives the real-time database update request. The data experience API 120 may receive the request from an automated processing device 104, a user application server 106, or an end-user device 108.

At operation 304, the data experience API 120 processes the real-time database update request. In examples, the data experience API 120 processes the request to determine whether the request maps to an activity and, if so, what update to the status of that activity is made by the request.

At operation 306, the data experience API 120 determines whether mapping the real-time database update request to a state is unsuccessful because no activity field maps to the request. If not, the data experience API 120 directly transitions to operation 308. Otherwise, the data experience API 120 first stores the request in internal queue 116 at operation 310. When the activity field corresponding to the request is received at operation 312, the data experience API 120 performs operation 308.

At operation 308, the data experience API 120 performs update operations corresponding to the real-time database update request. In examples, the data experience API 120 executes the update operations by providing the status change corresponding to request to the activity data API 128. The activity data API 128 may then update the state database 132 based on the state result.

Figure 4:
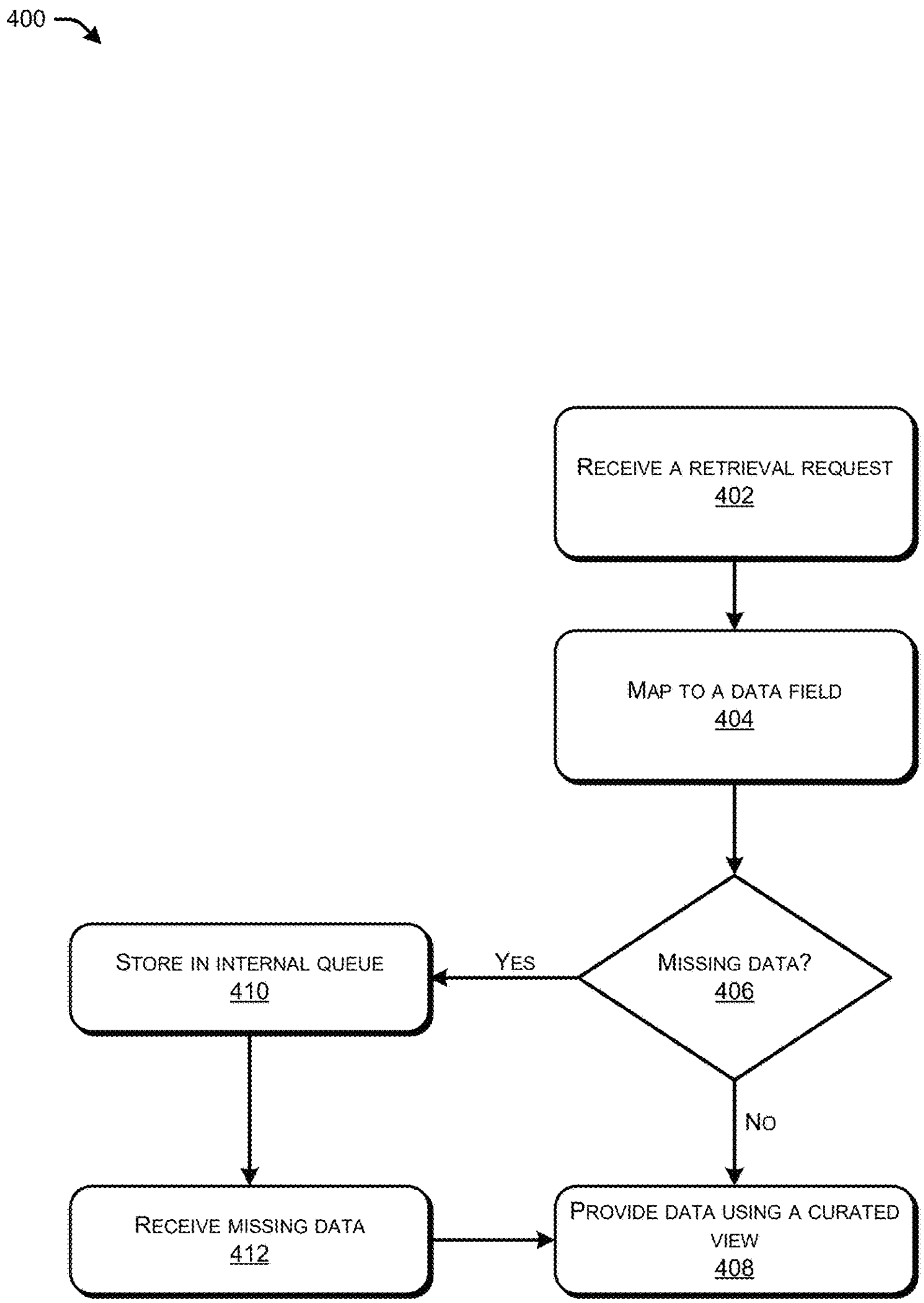
FIG. 4 is a flowchart diagram of an example process for performing data retrieval using a state database that may be updated using asynchronous and real-time update workflows.

FIG. 4 is a flowchart diagram of an example process 400 for performing data retrieval of a state database 132 that may be updated using asynchronous and real-time update workflows. At operation 402, the data experience API 120 receives the data retrieval request. The data experience API 120 may receive the request from an automated processing device 104, a user application server 106, or an end-user device 108.

At operation 404, the data experience API 120 processes the data retrieval request. In examples, the data experience API 120 processes the request to determine whether the request maps to a state (e.g., to a processing plan) and, if so, retrieve the plan.

At operation 406, the data experience API 120 determines whether mapping the data retrieval request to a state is unsuccessful because no activity and/or status field maps to the request. If not, the data experience API 120 directly transitions to operation 408. Otherwise, the data experience API 120 first stores the request in internal queue 116 at operation 410. When the activity and/or status field corresponding to the request is received at operation 412, the data experience API 120 performs operation 408. In some cases, performing operation 412 may include initiating an asynchronous request processing workflow to retrieve the missing data (e.g., missing activity and/or status).

At operation 408, the data experience API 120 provides the requested data using a curated view (e.g., a user-specific view). In examples, the data experience API 120 provides the state result mapped to the request to the activity data API 128. The activity data API 128 may then retrieve data corresponding to the state result from the state database 132 and provide the retrieved data to the data experience API 120 for providing to a user in accordance with a curated view.

Figure 5:
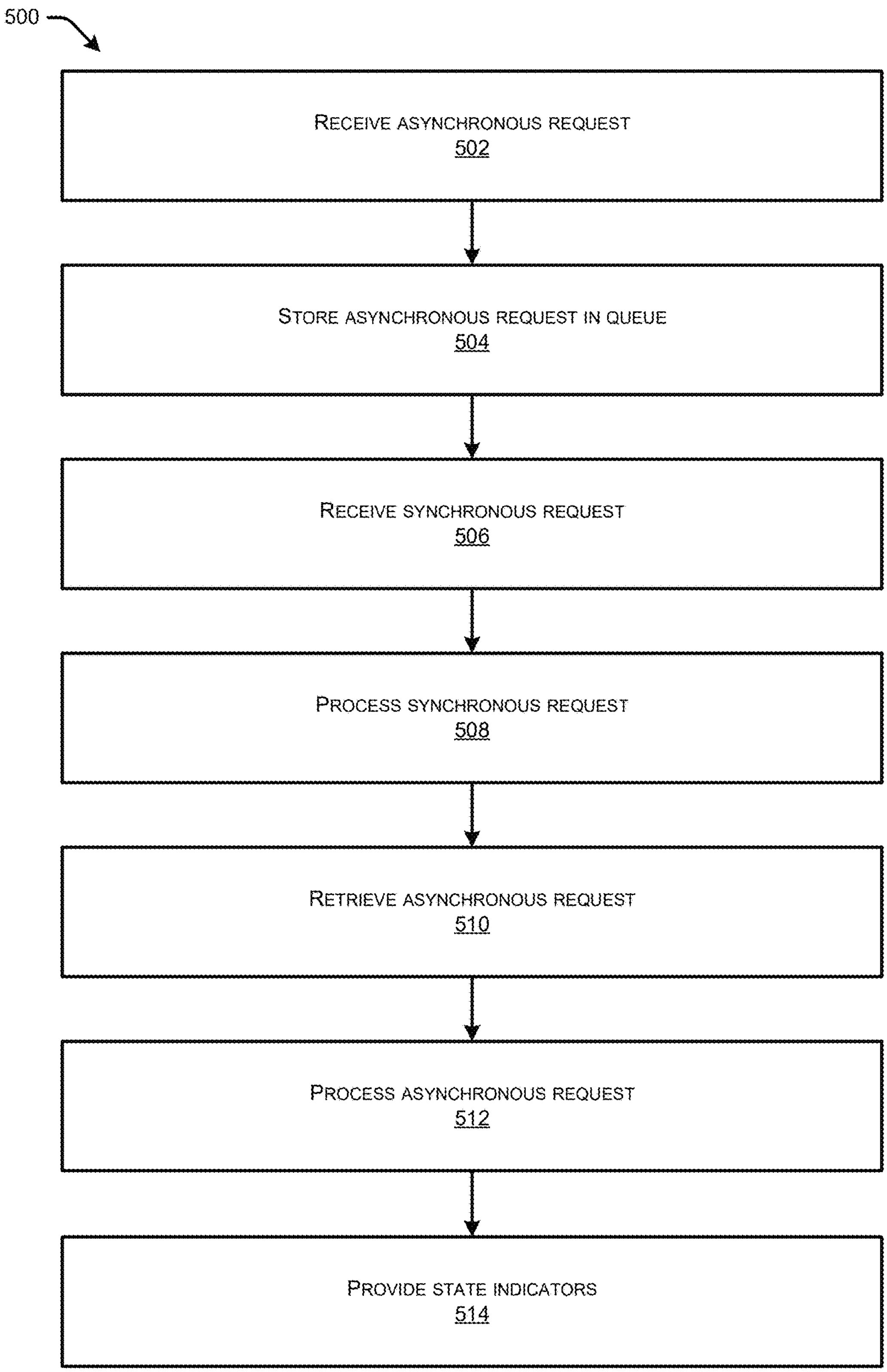
FIG. 5 is a flowchart diagram of an example process for processing asynchronous and real-time database update requests.

FIG. 5 is a flowchart diagram of an example process 500 for processing asynchronous and real-time database update requests. At operation 502, the service system 112 receives an asynchronous database update request. Operation 502 may include receiving, by a processor and at a first time (e.g., a first time period), a first request for updating a first data field asynchronously.

At operation 504, the service system 112 stores the asynchronous database update request in the asynchronous queue 118. In examples, the asynchronous queue 118 stores the requests according to an ordering determined based on receipt time and/or an update priority. Operation 502 may include storing, by the processor and at the first time, the first request in the asynchronous queue 118. The asynchronous update request may be a notification about change in data, such as change in data stored by the master database 140.

At operation 506, the service system 112 receives an asynchronous database update request. Operation 506 may include receiving, by the processor and at a second time (e.g., a second time that starts and/or occurs after the first time), a request for updating the first data field synchronously.

At operation 508, the service system 112 processes the asynchronous database update request to determine a first state. Operation 508 may include determining, by the processor and at the second time, a first state (e.g., an updated state) of the first data field based on the second request.

At operation 510, the service system 112 retrieves the asynchronous database update request from the asynchronous queue 118. In examples, the core processor 124 retrieves the asynchronous database update request from asynchronous queue 118 in accordance with the position of the request in the ordering associated with asynchronous queue 118. In examples, the core processor 124 retrieves requests (e.g., from at least one of error queue 114, internal queue 116, or asynchronous queue 118) using a set of parallel execution threads. Operation 510 may include retrieving, by the processor and at a third time, the first request from the asynchronous queue.

At operation 512, the service system 112 processes the retrieved asynchronous database update request to determine a second state. Operation 512 may include determining, by the processor and at the third time, a second state of the first data field based on the first request.

At operation 514, the service system 112 provides the first state and the second state to a software application. The two states may be provided to the software application collectively or separately. For example, operation 514 may include providing, by the processor and at the second time, the first state to a software application, and providing, by the processor and at the third time, the second state to the software application. In examples, providing the second state includes detecting a persistent communication channel (e.g., a WebSocket channel) with the software application. based on detecting the persistent communication channel, generating an execution thread for transmitting content using the persistent communication channel, and, at the third time, configuring the execution thread to transmit the second state.

Figure 6:
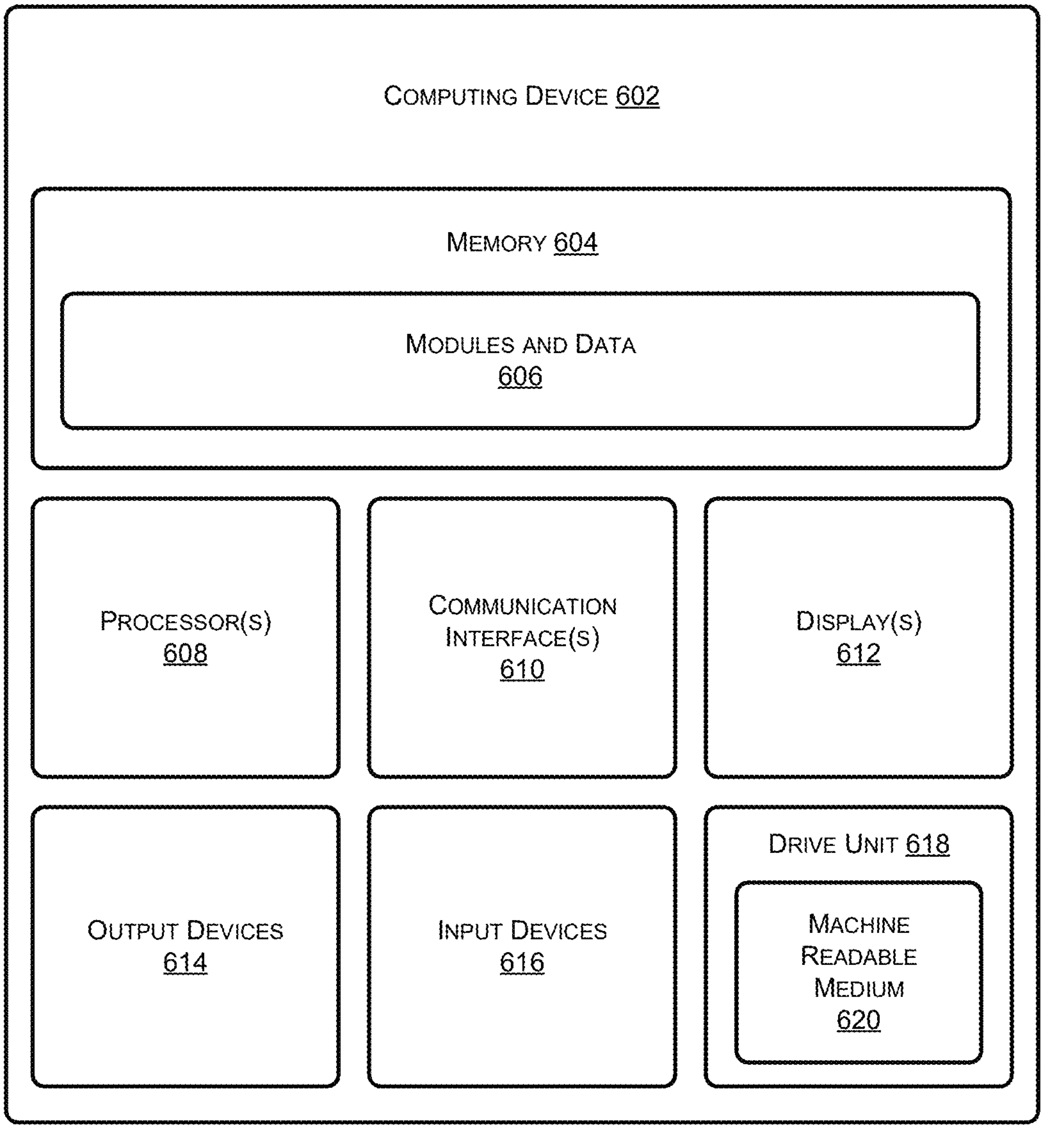
FIG. 6 shows an example system architecture for a computing device that may execute operations configured to enable coordinated asynchronous and real-time updates of a database.

FIG. 6 shows an example system architecture for a computing device 602 associated with the environment 100 described herein. A computing device 602 can be a server, computer, or other type of computing device that executes at least a portion of the environment 100. In some examples, elements of the environment 100 can be distributed among, and/or be executed by, multiple computing devices 602.

A computing device 602 can include memory 604. In various examples, the memory 604 can include system memory, which may be volatile (such as RAM), non-volatile (such as ROM, flash memory, etc.) or some combination of the two. The memory 604 can further include non-transitory computer-readable media, such as volatile and nonvolatile, removable and non-removable media implemented in any method or technology for storage of information, such as computer readable instructions, data structures, program modules, or other data. System memory, removable storage, and non-removable storage are all examples of non-transitory computer-readable media.

Examples of non-transitory computer-readable media include, but are not limited to, RAM, ROM, EEPROM, flash memory or other memory technology, CD-ROM, digital versatile discs (DVD) or other optical storage, magnetic cassettes, magnetic tape, magnetic disk storage or other magnetic storage devices, or any other non-transitory medium which can be used to store desired information and which can be accessed by one or more computing devices 602 associated with the environment 100. Any such non-transitory computer-readable media may be part of the computing devices 602. The memory 604 can include modules and data 606 needed to perform operations of one or more computing devices 602 of the environment 100.

One or more computing devices 602 of the environment 100 can also have processor(s) 608, communication interfaces 610, displays 612, output devices 614, input devices 616, and/or a drive unit 618 including a machine readable medium 620.

In various examples, the processor(s) 608 can be a central processing unit (CPU), a graphics processing unit (GPU), both a CPU and a GPU, or any other type of processing unit. Each of the one or more processor(s) 608 may have numerous arithmetic logic units (ALUs) that perform arithmetic and logical operations, as well as one or more control units (CUs) that extract instructions and stored content from processor cache memory, and then executes these instructions by calling on the ALUs, as necessary, during program execution. The processor(s) 608 may also be responsible for executing computer applications stored in the memory 604, which can be associated with common types of volatile (RAM) and/or nonvolatile (ROM) memory.

The communication interfaces 610 can include transceivers, modems, interfaces, antennas, telephone connections, and/or other components that can transmit and/or receive data over networks, telephone lines, or other connections.

The display 612 can be a liquid crystal display or any other type of display commonly used in computing devices. For example, a display 612 may be a touch-sensitive display screen, and can then also act as an input device or keypad, such as for providing a soft-key keyboard, navigation buttons, or any other type of input.

The output devices 614 can include any sort of output devices known in the art, such as a display 612, speakers, a vibrating mechanism, and/or a tactile feedback mechanism. Output devices 614 can also include ports for one or more peripheral devices, such as headphones, peripheral speakers, and/or a peripheral display.

The input devices 616 can include any sort of input devices known in the art. For example, input devices 616 can include a microphone, a keyboard/keypad, and/or a touch-sensitive display, such as the touch-sensitive display screen described above. A keyboard/keypad can be a push button numeric dialing pad, a multi-key keyboard, or one or more other types of keys or buttons, and can also include a joystick-like controller, designated navigation buttons, or any other type of input mechanism.

The machine readable medium 620 can store one or more sets of instructions, such as software or firmware, that embodies any one or more of the methodologies or functions described herein. The instructions can also reside, completely or at least partially, within the memory 604, processor(s) 608, and/or communication interface(s) 610 during execution thereof by the one or more computing devices 602 of the environment 100. The memory 604 and the processor(s) 608 also can constitute machine readable media 620.

Although the subject matter has been described in language specific to structural features and/or methodological acts, it is to be understood that the subject matter is not necessarily limited to the specific features or acts described above. Rather, the specific features and acts described above are disclosed as example embodiments.

What is claimed is:

1. A method comprising:
- receiving, by a processor and at a first time, a first request for updating a first data field asynchronously;
- storing, by the processor and at the first time, and based on determining that the first request is asynchronous, the first request in an asynchronous queue;
- retrieving, by the processor and at a second time, the first request from the asynchronous queue;
- determining, by the processor and at the second time, that the first request generates an error, wherein the error represents a failure to map the first request to the first data field;
- storing, by the processor and at the second time, the first request in an error queue, wherein storing the first request in the error queue is based on determining that the first request generates the error and on determining that the first request is asynchronous;
- retrieving, by the processor and at a third time, the first request from the error queue, wherein retrieving the first request from the error queue is at least one of:
  - performed periodically, or
  - performed based on receiving an indication of an update to definition data associated with a database, the database comprising the first data field;
- determining, by the processor and at the third time, and based on successfully mapping the first request to the first data field, a first state of the first data field based on the first request; and
- providing, by the processor and at the third time, the first state to a software application.

2. The method of claim 1, further comprising:
- modifying, by the processor and at the second time, a state database based on the first state; and
- modifying, by the processor and at the third time, the state database based on the first state.

3. The method of claim 2, further comprising:
- receiving, by the processor and a fourth time, a second request for data retrieval of a latest state of the first data field;
- querying, by the processor, the state database to retrieve the latest state; and
- providing, by the processor, the latest state in response to the second request.

4. The method of claim 1, wherein;
- the first request is received as a query to a representation state transfer (REST) application programming interface (API); and
- providing the first state comprises providing the first state as an API response of the REST API and in response to the query.

5. The method of claim 1, wherein:
- providing the first state comprises transmitting the first state as a notification over a WebSocket connection.

6. The method of claim 1, wherein determining the first state comprises:

retrieving a set of state definitions associated with the first data field; and processing the first request based on the set of state definitions to determine the first state.

7. The method of claim 1, wherein providing the first state comprises:

detecting a persistent communication channel with the software application;

based on detecting the persistent communication channel, generating an execution thread for transmitting content using the persistent communication channel; and at the third time, configuring the execution thread to transmit the first state.

8. A computing system, comprising:

a processor; and memory storing computer-executable instructions that, when executed by the processor, cause the computing system to perform operations comprising:

receiving, at a first time, a first request for updating a first data field asynchronously;

storing, at the first time, and based on determining that the first request is asynchronous, the first request in an asynchronous queue;

retrieving, at a second time, the first request from the asynchronous queue;

determining, at the second time, that the first request generates an error, wherein the error represents a failure to map the first request to the first data field;

storing, at the second time, the first request in an error queue, wherein storing the first request in the error queue is based on determining that the first request generates the error and on determining that the first request is asynchronous;

retrieving, at a third time, the first request from the error queue, wherein retrieving the first request from the error queue is at least one of:

performed periodically, or performed based on receiving an indication of an update to definition data associated with a database, the database comprising the first data field;

determining, at the third time, and based on successfully mapping the first request to the first data field, a first state of the first data field based on the first request; and providing, at the third time, the first state to a software application.

9. The computing system of claim 8, the operations further comprising:

modifying, by the processor and at the second time, a state database based on the first state; and modifying, by the processor and at the third time, the state database based on the first state.

10. The computing system of claim 9, the operations further comprising:

receiving, by the processor and a fourth time, a second request for data retrieval of a latest state of the first data field;

querying, by the processor, the state database to retrieve the latest state; and providing, by the processor, the latest state in response to the second request.

11. The computing system of claim 8, wherein;

the first request is received as a query to a representation state transfer (REST) application programming interface (API); and providing the first state comprises providing the first state as an API response of the REST API and in response to the query.

12. The computing system of claim 8, wherein:

providing the first state comprises transmitting the first state as a notification over a WebSocket connection.

13. The computing system of claim 8, wherein determining the first state comprises:

retrieving a set of state definitions associated with the first data field; and processing the first request based on the set of state definitions to determine the first state.

14. The computing system of claim 8, wherein providing the first state comprises:

detecting a persistent communication channel with the software application;

based on detecting the persistent communication channel, generating an execution thread for transmitting content using the persistent communication channel; and at the third time, configuring the execution thread to transmit the first state.

15. One or more non-transitory computer-readable media storing computer-executable instructions that, when executed by a processor, cause the processor to perform operations, comprising:

receiving, at a first time, a first request for updating a first data field asynchronously;

storing, at the first time, and based on determining that the first request is asynchronous, the first request in an asynchronous queue;

retrieving, at a second time, the first request from the asynchronous queue;

determining, at the second time, that the first request generates an error, wherein the error represents a failure to map the first request to the first data field;

storing, at the second time, the first request in an error queue, wherein storing the first request in the error queue is based on determining that the first request generates the error and on determining that the first request is asynchronous;

retrieving, at a third time, the first request from the error queue, wherein retrieving the first request from the error queue is at least one of:

performed periodically, or performed based on receiving an indication of an update to definition data associated with a database, the database comprising the first data field;

determining, at the third time, and based on successfully mapping the first request to the first data field, a first state of the first data field based on the first request; and providing, at the third time, the first state to a software application.

16. The one or more non-transitory computer-readable media of claim 15, the operations further comprising:

modifying, by the processor and at the second time, a state database based on the first state; and modifying, by the processor and at the third time, the state database based on the first state.

17. The one or more non-transitory computer-readable media of claim 16, the operations further comprising:

receiving, by the processor and a fourth time, a second request for data retrieval of a latest state of the first data field;

querying, by the processor, the state database to retrieve the latest state; and providing, by the processor, the latest state in response to the second request.

18. The one or more non-transitory computer-readable media of claim 15, wherein;

the first request is received as a query to a representation state transfer (REST) application programming interface (API); and providing the first state comprises providing the first state as an API response of the REST API and in response to the query.

19. The one or more non-transitory computer-readable media of claim 15, wherein:

providing the first state comprises transmitting the first state as a notification over a WebSocket connection.

20. The one or more non-transitory computer-readable media of claim 15, wherein determining the first state comprises:

retrieving a set of state definitions associated with the first data field; and processing the first request based on the set of state definitions to determine the first state.

* * * * *